US005802045A

United States Patent [19]
Kos et al.

[11] Patent Number: 5,802,045
[45] Date of Patent: Sep. 1, 1998

[54] METHOD OF USING A NARROWBAND SERVER TO PROVIDE SERVICE FEATURES TO BROADBAND SUBSCRIBERS

[75] Inventors: Richard James Kos, North Riverside; Alex Lawrence Wierzbicki, Bolingbrook; Hsien-Chuen Yu, Naperville; Meyer Joseph Zola, Lisle, all of Ill.

[73] Assignee: Lucent Technologies Inc., Murray Hill, N.J.

[21] Appl. No.: 641,322

[22] Filed: Apr. 30, 1996

[51] Int. Cl.⁶ .................................................. H04L 12/66
[52] U.S. Cl. ........................ 370/352; 370/410; 370/466; 370/522
[58] Field of Search .................................. 370/356, 352, 370/401, 410, 467, 466, 487, 522, 353

[56] References Cited

U.S. PATENT DOCUMENTS

| | | | |
|---|---|---|---|
| 5,115,427 | 5/1992 | Johnson, Jr. et al. | 370/391 |
| 5,287,348 | 2/1994 | Schmidt et al. | 370/60.1 |
| 5,327,421 | 7/1994 | Hiller et al. | 370/395 |
| 5,345,445 | 9/1994 | Hiller et al. | 370/358 |
| 5,345,446 | 9/1994 | Hiller et al. | 370/358 |
| 5,365,524 | 11/1994 | Hiller et al. | 370/376 |
| 5,390,175 | 2/1995 | Hiller et al. | 370/398 |
| 5,422,882 | 6/1995 | Hiller et al. | 370/352 |
| 5,426,636 | 6/1995 | Hiller et al. | 370/352 |
| 5,428,607 | 6/1995 | Hiller et al. | 370/352 |
| 5,434,852 | 7/1995 | La Porta et al. | 370/58.2 |
| 5,452,297 | 9/1995 | Hiller et al. | 370/395 |
| 5,526,359 | 6/1996 | Read et al. | 370/100.1 |
| 5,623,491 | 4/1997 | Skoog | 370/397 |

*Primary Examiner*—Min Jung
*Attorney, Agent, or Firm*—Mony R. Ghose

[57] ABSTRACT

A method for providing narrowband-related service features to subscribing broadband lines comprises establishing a composite voice path interconnecting a narrowband server and the subscribing broadband line via a broadband switching fabric. Particularly, a call set-up signal is received in a broadband call processor, converted to narrowband signaling format and extended to a designated narrowband server. Responsive to receipt of the call set-up signal, the designated narrowband server establishes a narrowband voice path interconnecting a narrowband network element to a synchronous-asynchronous converter. Subsequently, the broadband call processor establishes a broadband segment interconnecting the subscribing broadband line with the synchronous-asynchronous converter. The broadband segment corresponds to the narrowband voice path to form a composite voice path. The composite voice path is used by the designated narrowband server to provide narrowband-related service features to the subscribing broadband line. After a call in which narrowband-related features may be invoked has been disconnected, the composite voice path is released.

14 Claims, 8 Drawing Sheets

METHOD OF USING A NARROWBAND SERVER TO PROVIDE SERVICE FEATURES TO BROADBAND SUBSCRIBERS

FIELD OF THE INVENTION

This invention relates to telecommunications networks, and more particularly, to a method for providing service features to broadband subscriber lines in such telecommunications networks.

BACKGROUND OF THE INVENTION

The public-switched telephone network (PSTN) comprises: a large number of central office switches for serving local subscriber lines and trunks; a smaller number of tandem switches for providing connections between central office switches; a large plurality of analog and digital communication paths for interconnecting central office switches and tandem switches; optional databases for storing information; and a common channel signaling (CCS) system overlay which transmits signaling messages used by the switches for establishing call connections.

Currently, most PSTN switches, including the 5ESS® central office switch manufactured by Lucent Technologies (formerly AT&T Network Systems), provide traditional "narrowband-related" service features like call waiting, call forwarding, and voice mail. Although not exclusively synonymous with voice switching, narrowband equipment is known in the art for the reliable switching of voice traffic. Indeed, it is the advanced software applications deployed in these switches, combined with well-established narrowband signaling protocols, which enable the implementation of the aforementioned service features.

Even though narrowband telecommunications equipment is dependable, and widely used, it does not serve the emerging needs of subscribers who desire to send video, or other types of broadband data transmissions via the PSTN. To accommodate "broad" bandwidth transmissions, asynchronous transfer mode (ATM) switches like the Globeview 2000®, also manufactured by Lucent Technologies, are deployed. Broadband (or ATM) switches operate within a broadband sub-network which, along with the narrowband sub-network, comprises the PSTN. To facilitate interaction between the sub-networks, narrowband-to-broadband converters (frequently referred to as synchronous-to-asynchronous converters) are used.

The prevalence of narrowband switches as the vehicle for providing central office telecommunications service is partly due to the well-established ability of the switches to provide traditional narrowband-related service features. Unfortunately, the relatively recent introduction of ATM switches necessitates a significant investment in software development before these switches can match the range of traditional narrowband-related service features provided by the narrowband sub-network. The costs associated with developing the broadband-specific software has been a barrier to providing traditional features in broadband switches. Therefore, there is a need in the art for enhancing the use of the broadband sub-network by cost efficiently enabling broadband switches to provide traditional narrowband-related service features.

SUMMARY OF INVENTION

This need is addressed and technological advance is achieved in the art by the method and system of the present invention which utilizes a broadband switch, preferably an ATM switch, and at least one narrowband server to provide traditional narrowband-related service features to subscribing broadband lines. Narrowband-related service features include voice features, and certain types of data service features, such as may be provided via the integrated services digital network (ISDN). Hereinafter, narrowband-related service features will be referred to as "voice" features for simplicity.

In accordance with the present invention, a voice call set-up signal is received in a broadband call processor of an integrated broadband/narrowband switch. If it is determined that a broadband line identified in the call set-up signal subscribes to narrowband-related service features, the broadband call processor converts the call set-up signal to narrowband signaling format, and transmits the converted signal to a designated narrowband server.

On a per call basis, the designated narrowband server establishes a narrowband voice path which interconnects with a corresponding broadband segment via a synchronous-to-asynchronous converter (SAC) to form a composite voice path. The composite voice path interconnects the designated narrowband server and the subscribing broadband line. A connection between the subscribing broadband line and another party (that is, either a caller or a called party, depending upon the circumstance) is also established, as is known in the art. The composite voice path remains operational for the entire duration of a call in which narrowband-related service features may be activated. During the course of the call, the designated narrowband server administers subscribed to narrowband-related service features over the composite voice path, as appropriate. After the call is disconnected, the composite voice path is released.

DETAILED DESCRIPTION

Figure 1A:
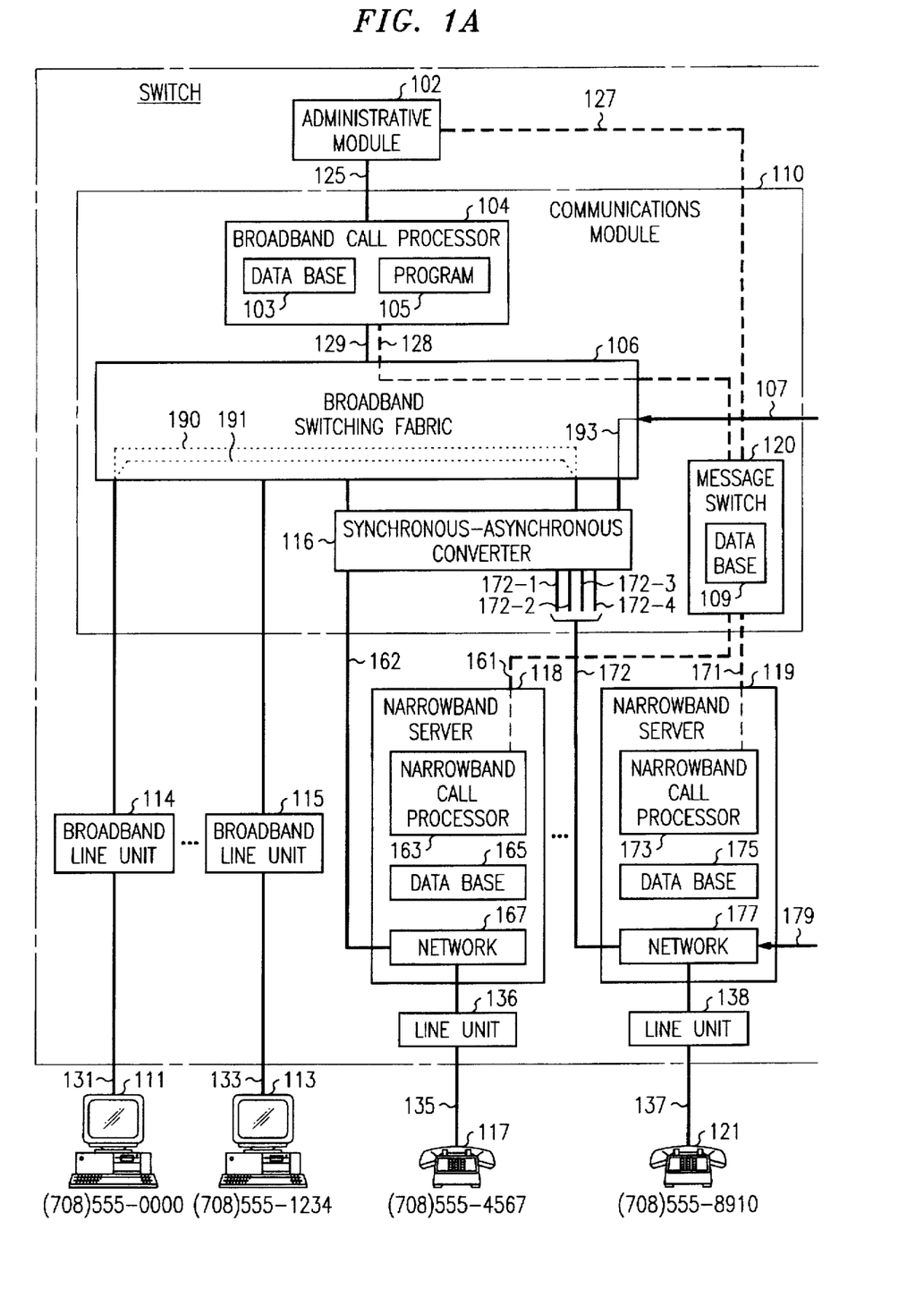
FIGS. 1A–1C are simplified block diagrams of an integrated broadband/narrowband switch in which the present invention may be practiced.
Figure 1B:
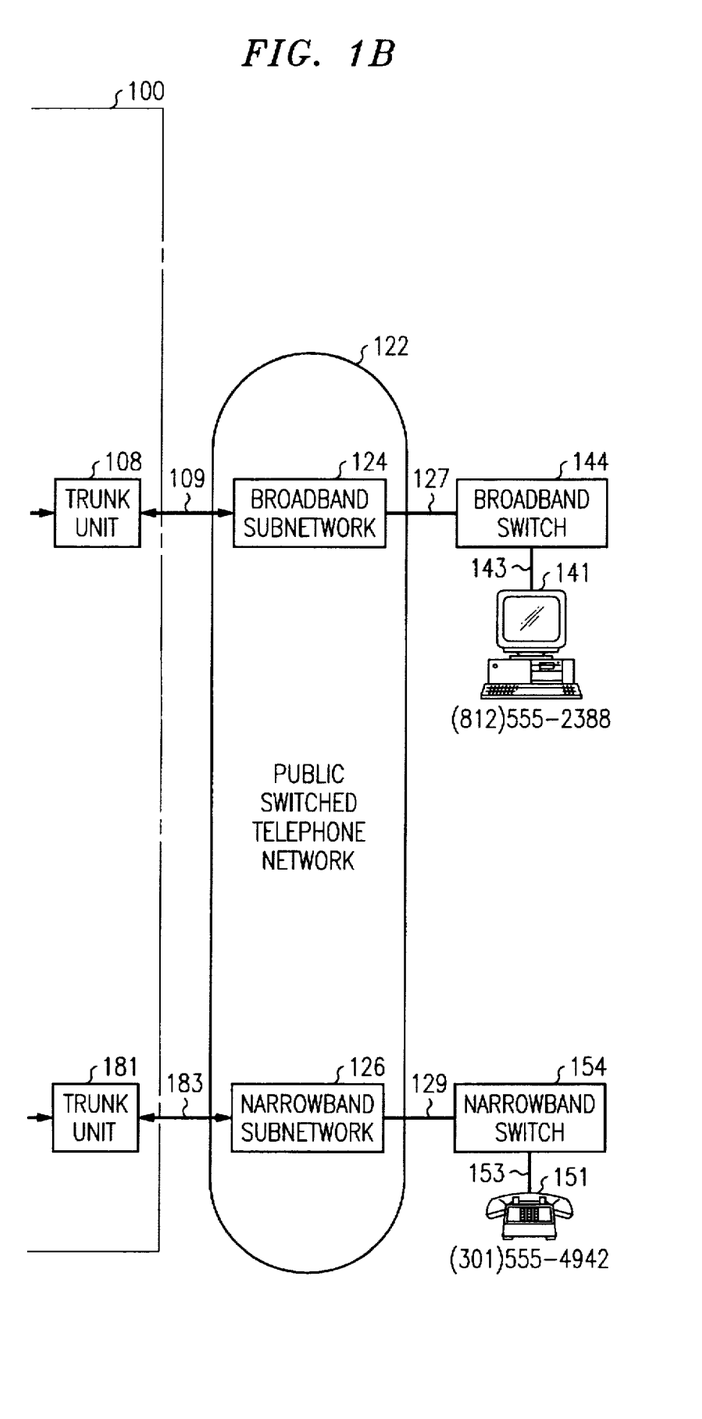
Figure 1C:
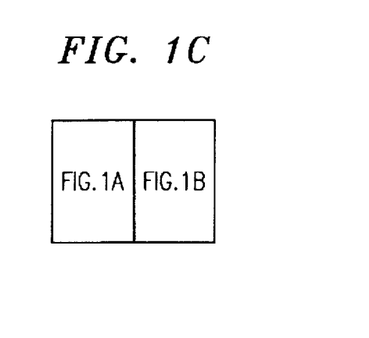

FIG. 1 shows a simplified block diagram of integrated broadband/narrowband switch 100 (hereinafter, integrated switch 100) in which the method of the present invention may be practiced. Although an "integrated" switch is shown, alternative embodiments may employ a conventional broadband switch interconnected to a separate, narrowband service feature adjunct including a feature database, a conversion program, and at least one narrowband server. In this example, integrated switch 100 comprises: administrative module 102; communications module 110; broadband line units 114, 115; narrowband servers 118, 119; narrowband line units 136, 138; and trunk units 108, 181. Also shown is the public-switched telephone network (PSTN) 122 comprising broadband sub-network 124, and narrowband sub-network 126.

Integrated switch 100 serves broadband customer premises equipment (CPE) 111, identified by directory number "(708) 555-0000," and broadband CPE 113 identified by directory number "(708) 555-1234," via broadband lines 131 and 133, respectively. The switch also serves narrowband CPE (telephone) 117, identified by directory number "(708) 555-4567," and telephone 121 identified by directory number "(708) 555-8910," via narrowband lines 135 and 137, respectively. Narrowband line units 136 and 138 are interfaces between the switch and narrowband subscriber lines. Also shown is broadband CPE 141, identified by directory number "(812) 555-2388," and served by broadband switch 144 via broadband subscriber line 143. Telephone 151, identified by directory number "(301) 555-4942," is served by narrowband switch 154 via narrowband subscriber line 153. Broadband switch 144 and narrowband switch 154 are interconnected to PSTN 122 via dedicated trunks 127 and 129, respectively.

Administrative module (AM) 102 issues broadband control functions over datalink 125 which interconnects the module to communications module 110. The administrative module also executes narrowband control functions (for system control of narrowband servers 118, 119) via datalink 127. Datalink 127 interconnects AM 102 to message switch (MS) 120 of communications module 110.

Communications module 110 comprises: broadband call processor 104; broadband switching fabric 106 (preferably, an ATM switching fabric); synchronous-to-asynchronous converter (SAC) 116; and MS 120. Broadband call processor 104 includes narrowband server database 103 for storing information matching subscribing broadband lines with designated narrowband servers, and broadband-to-narrowband conversion program 105 for converting between signaling formats, as described below. Broadband call processor 104 is interconnected to broadband switching fabric 106 by datalink 129. The broadband switching fabric performs switching functions for integrated switch 100, and delivers call set-up signals to broadband call processor 104, as known in the art. Broadband switching fabric 106 is interconnected to broadband trunk unit 108 by a virtual channel over channel link 107. Broadband trunk unit 108 is interconnected to broadband sub-network 124 by a virtual channel over physical facility 109. SAC 116 facilitates connections between synchronous narrowband servers 118, 119 and asynchronous broadband switching fabric 106. Since synchronous to asynchronous conversion is well-known in the art, SAC 116 is not described in detail herein.

MS 120 is a distribution point for messages relayed between broadband call processor 104, and the narrowband servers. MS 120 also acts as an intermediary for relaying messages among the narrowband servers. Particularly, provisioned signaling path 128 is maintained between broadband call processor 104, and MS 120. Provisioned signaling paths 161, and 171, interconnect MS 120 and narrowband servers 118 and 119, respectively. Although only two narrowband servers are shown for clarity, alternative embodiments may include one or more narrowband servers.

Narrowband server 118 comprises narrowband call processor 163, data base 165, and network element 167. Similarly, narrowband server 119 comprises narrowband call processor 173, database 175 and network element 177. In the preferred embodiment, narrowband servers 118 and 119 provide telecommunications services to narrowband subscriber lines 135, 137, and also extend narrowband-related service features to subscribing broadband lines in a process described in detail below. Subscriber databases 165, and 175, store service feature information for each subscribing broadband, or narrowband, line allocated to that server.

Each narrowband server maintains a connection between its network element, and SAC 116 for communication with subscribing broadband lines via broadband switching fabric 106. Particularly, multi-channel link 162 interconnects network element 167 to SAC 116, while multi-channel link 172 performs a similar function for network element 177. Multi-channel links 162 and 172 may carry a plurality of voice paths simultaneously. In this example, only network element 177 is interconnected to narrowband sub-network 126 via link 179 terminating at trunk unit 181, and bi-directional trunk 189. Alternative embodiments may elect to establish separate connections between each narrowband server to the narrowband sub-network. In accordance with the present invention, narrowband-related service features subscribed to by broadband lines 131 and 133 are administered by narrowband servers 119 and 118, respectively. Particularly, whenever a broadband line is in a "voice active" state (that is, a state in which the broadband line is participating in a call in which narrowband-related service features may be invoked), a composite voice path comprising a narrowband voice path, and a broadband segment, is established between the broadband line and its designated narrowband server.

For purposes of example, assume that a caller associated with broadband CPE 111 wishes to place a call to a party served by telephone 117. In this case, the caller and called party are both served by integrated switch 100. In other embodiments, the called party may be served by any other switch in the PSTN. Broadband line 131 (that is, the broadband line corresponding to broadband CPE 111) subscribes to narrowband-related service features including call waiting, and three-way calling. The designated narrowband server for broadband line 131 is narrowband server 119. FIGS. 2A, 2B, 2C and 2D show the steps performed by integrated switch 100 to originate the call, and to provide narrowband-related service features to broadband line 131 during the call.

Figure 2A:
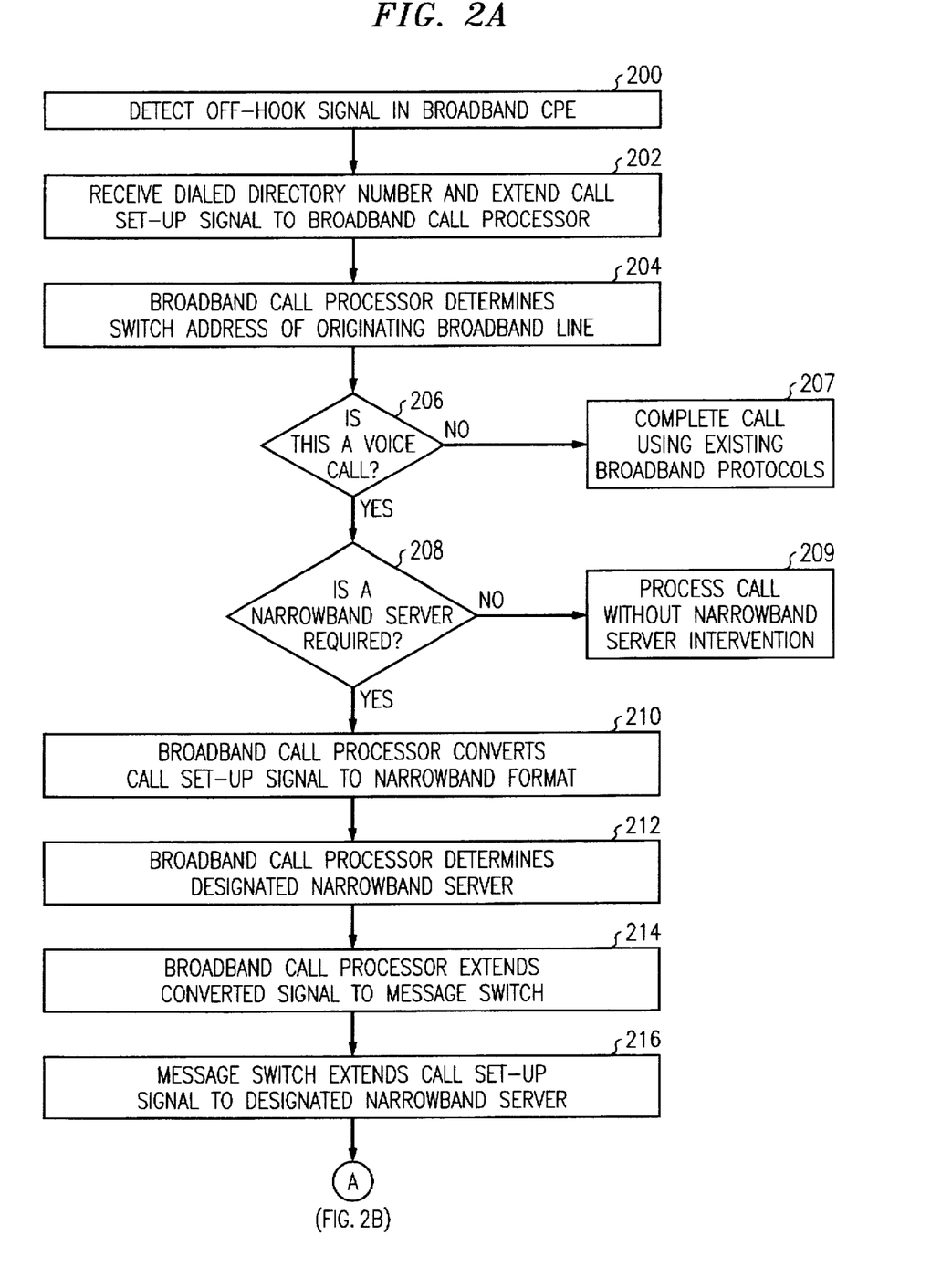
FIGS. 2A, 2B, 2C and 2D are flow diagrams of the steps performed by the integrated switch of FIG. 1 when a subscribing broadband line originates a call in which narrowband-related service features are activated.

The process begins in step 200 when broadband line unit 114 detects an "off-hook" signal from broadband CPE 111. As known in the art, the off-hook signal is an indication to the serving switch (that is, integrated switch 100) that a caller has altered the state of the CPE to originate, or receive a call. In step 202, broadband line unit 114 receives a directory number dialed by the caller at broadband CPE 111, and extends a call set-up signal to broadband call processor 104. The call set-up signal includes directory number "(708) 555-0000" which identifies broadband line 131 serving the caller, directory number "(708) 555-4567" identifying narrowband line 135 serving the called party, and the call type (that is, whether the call is a voice-type, or broadband-type call). In accordance with the present invention, a voice-type call includes standard voice transmission, and certain types of data transmission including ISDN data transmission. In this case, assume the caller wishes to place a standard voice call to the called party. In step 204, the broadband call processor determines a switch address of the originating subscriber line. In other words, broadband call processor 104 identifies broadband line 131 (that is, the subscriber line associated with the caller's directory number "(708) 555-0000").

The process continues to decision step 206 in which the broadband call processor determines if the caller wishes to place a voice-type call by reviewing the call type data in the call set-up signal. If the outcome of decision step 206 is a "NO" determination, the process continues to step 207 in which the call is completed using existing broadband protocols, as known in the art. If, as in this example, the outcome of decision step 206 is a "YES" determination, the process continues to decision step 208 in which the broadband call processor determines whether a narrowband server is required for this call. Particularly, broadband call processor 104 accesses internal database 103 to determine whether the broadband line associated with the caller's directory number "(708) 555-0000" subscribers to service features, and whether the subscribed features require a narrowband server for implementation. Decision step 208 is required for those circumstances in which the broadband switch may be capable of providing some voice features without narrowband server intervention. If the outcome of decision step 208 is a "NO" determination, the process continues to step 209 in which the call is processed without narrowband server intervention.

In this example, however, the outcome of decision step 206 is a "YES" determination (that is, the caller's broadband line subscribes to service features which require narrowband server intervention), so the process continues to step 210 in which the broadband call processor converts the call set-up signal to narrowband signaling format. Particularly, broadband call processor 104 uses broadband-to-narrowband conversion program 105 to translate the call set-up signal received from broadband line 131 to narrowband signaling format.

In step 212, broadband call processor 104 determines the designated narrowband server for the requesting broadband line 131 by using the information in database 103. In this case, the designated server is narrowband server 119. In step 214, broadband call processor 104 extends the converted call set-up signal to MS 120 over established signaling path 128. In step 216, MS 120 extends the call set-up signal to designated narrowband server 119 over signaling path 171.

Figure 2B:
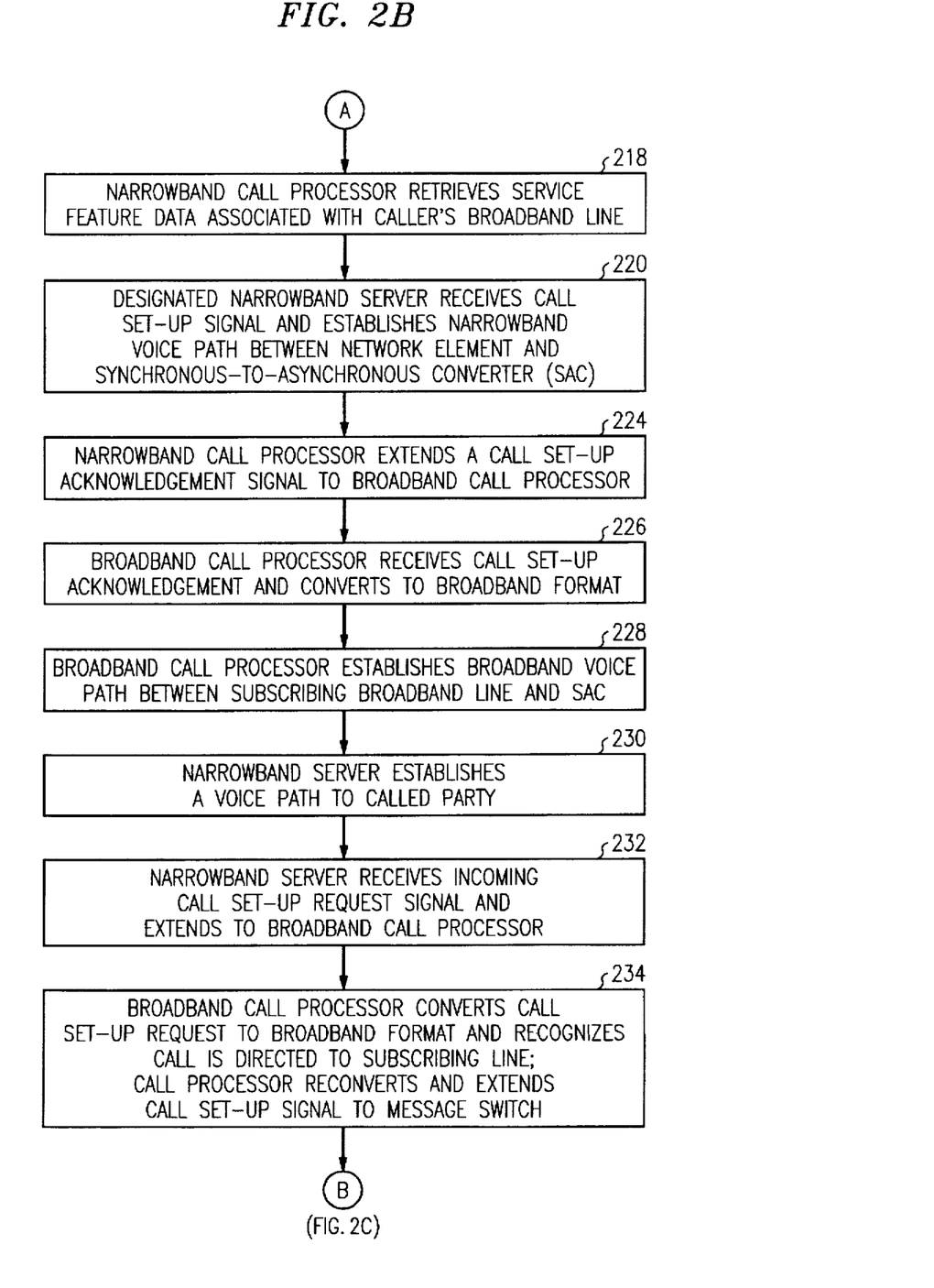

The process continues through connector A to FIG. 2B and step 218 in which narrowband call processor 173 retrieves and validates feature data associated with the subscribing broadband line 131 from narrowband service feature database 175. In this case, narrowband call processor 173 retrieves information indicating that broadband line 131 subscribes to call waiting, and three-way calling features. In step 220, designated narrowband server 119 receives the call set-up signal, and uses information relating to broadband line 131 contained therein, to establish a first narrowband voice path 172-1 between network element 177, and SAC 116 via multi-channel link 172. In step 224, the narrowband call processor 173 extends a call set-up acknowledgment signal to broadband call processor 104 over provisioned signaling path 128 via signaling path 171. The call set-up acknowledgment signal includes information which will enable broadband call processor 104 to establish broadband segment 190 between broadband line 131 and SAC 116 for interconnection with first narrowband voice path 172-1 to form a composite voice path. In step 226, the broadband call processor receives the call set-up acknowledgment signal, and converts the received signal to broadband signaling format. In step 228, broadband call processor 104 establishes broadband segment 190 between subscribing broadband line 131 and SAC 116, as known in the art. SAC 116 interconnects broadband segment 190 and first narrowband voice path 172-1 to form composite voice path 190/172-1 interconnecting broadband line 131, and network element 177 of designated narrowband server 119. In step 230, narrowband server 119 establishes a voice path to the called party at telephone 117 via a channel in link 172, SAC 116, broadband switching fabric 106, and a channel in link 162, as known in the art.

At some time during the call, there may be a need to activate a narrowband-related service feature. For example, assume that the party at broadband CPE 111 receives an incoming voice-type call from a caller at telephone 151 during an established telephone conversation with the called party at telephone 117. Since broadband line 131 subscribes to call waiting, a "call waiting" tone must be delivered to broadband line 131 in such a circumstance. Therefore, the process continues to step 232 in which narrowband call processor 173 receives an incoming call set-up request signal from the caller associated with telephone 151, and extends the call set-up request signal to broadband call processor 104 via MS 120. Particularly, narrowband call processor 173 receives an incoming call set-up signal from narrowband switch 154 over link 179 via trunk unit 181. Trunk unit 181 interconnects narrowband sub-network 126 to narrowband server 119 via bi-directional trunk 189. In this particular embodiment, all incoming narrowband calls are received in narrowband server 119. In most alternative embodiments, however, each narrowband server has a dedicated trunk unit interconnected to the narrowband sub-network. Further, in this example, the incoming call conveniently arrives in the designated narrowband server for the called party (i.e., the party associated with broadband line 131).

If the above-mentioned caller wishing to contact a party associated with broadband line 131 had originated the call from a broadband CPE (such as broadband CPE 141), the incoming call set-up request signal arrives in broadband call processor 104 in a different manner. Particularly, in step 232, the incoming call set-up request would be received in broadband switching fabric 106 from broadband sub-network 124 over channel link 107. Trunk unit 108 acts as an intermediary between channel link 107, and broadband sub-network 124. Once the incoming call request is received in the broadband switching fabric, the request is forwarded to broadband call processor 104 over data link 129, as known in the art.

Continuing with the above example, the process proceeds to step 234 in which broadband call processor 104 converts the call set-up request signal to broadband signaling format, and recognizes that the incoming voice-type call is directed to broadband line 131 which subscribes to narrowband-related service features. Accordingly, broadband call processor re-converts the call set-up request signal to narrowband signaling format, and extends it to MS 120 over provisional signaling path 128 for delivery to narrowband server 119. Note that if narrowband server 118 had been designated as the narrowband server for broadband line 131, the incoming call request would have been extended by the broadband call processor to MS 120 for delivery to designated narrowband server 118.

Figure 2C:
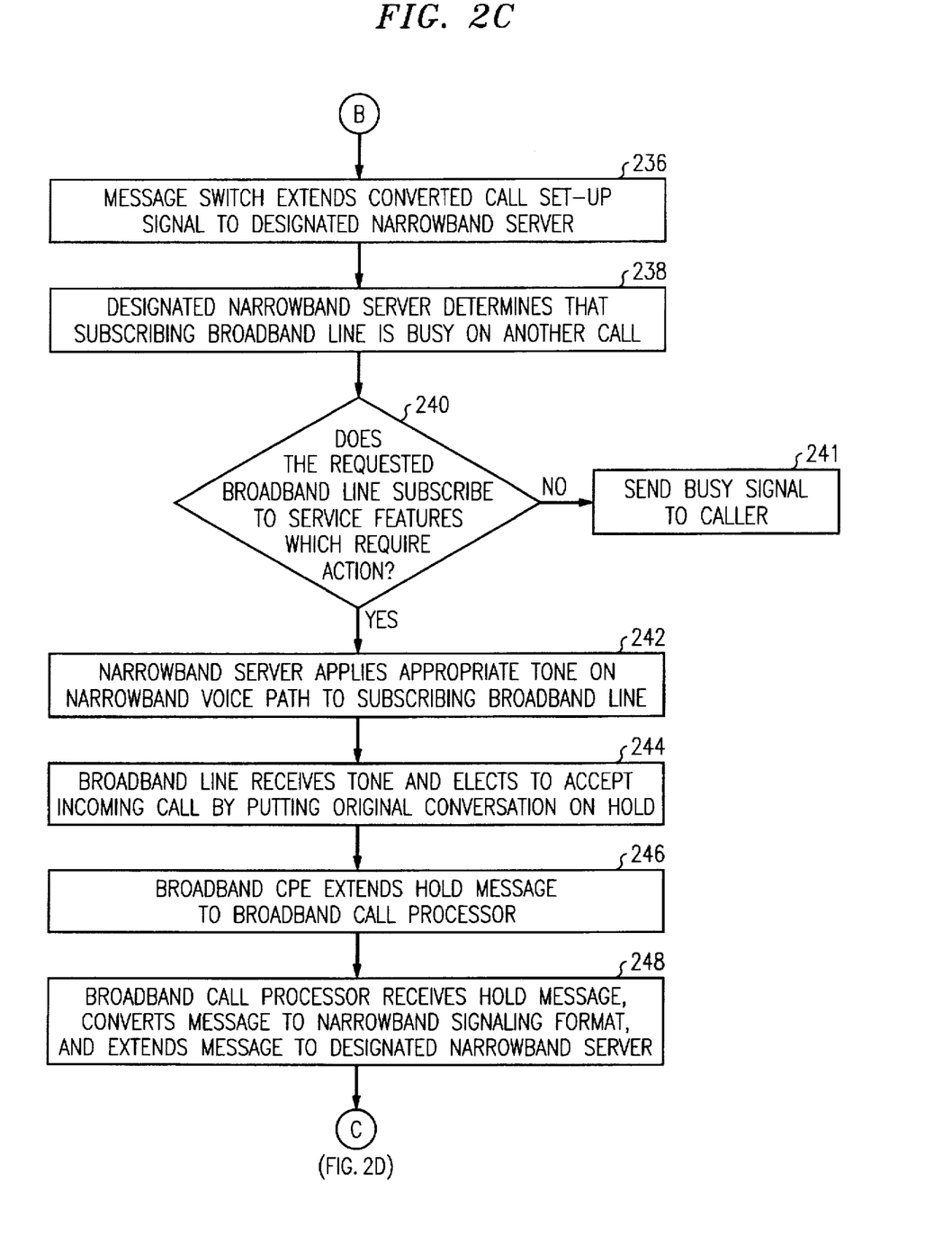

The process continues through connector B to FIG. 2C and step 236 in which MS 120 extends the converted calls set-up signal request to designated narrowband server 119. The process continues to step 238 in which the narrowband server determines that the subscribing broadband line is busy on an existing call. Particularly, the party at broadband CPE 111 is busy speaking to the party at telephone 117. In decision step 240, the narrowband server determines whether the requested broadband line subscribes to service features which require action (i.e. notification) of the incoming call (as required by a service feature such as call waiting). If the outcome of decision step 240 is "NO" determination (that is, broadband line 131 does not subscribe to a service feature which requires notification of incoming calls), the process continues to step 241 in which the narrowband server sends a busy signal to the caller at telephone 151. If, as in this case, the outcome of decision step 240 is a "YES" determination, the process continues to step 242 in which the narrowband server applies a call waiting tone on first narrowband voice path 172-1, which is delivered to broadband line 131 via broadband segment 190.

In step 244, assume that the party at broadband CPE 111 receives the call waiting tone, and elects to answer the incoming call from the party at telephone 151. Accordingly, the party at broadband CPE 111 puts the current conversation with the party at telephone 117 on "hold" using techniques known in the art. In step 246, broadband CPE 111 extends the hold message to broadband call processor 104, via broadband line 131. The process continues to step 248 in which broadband call processor 104 receives, and converts the hold message to narrowband signaling format. Subsequently, broadband call processor 104 extends the converted hold message to narrowband server 119 via message switch 120.

Figure 2D:
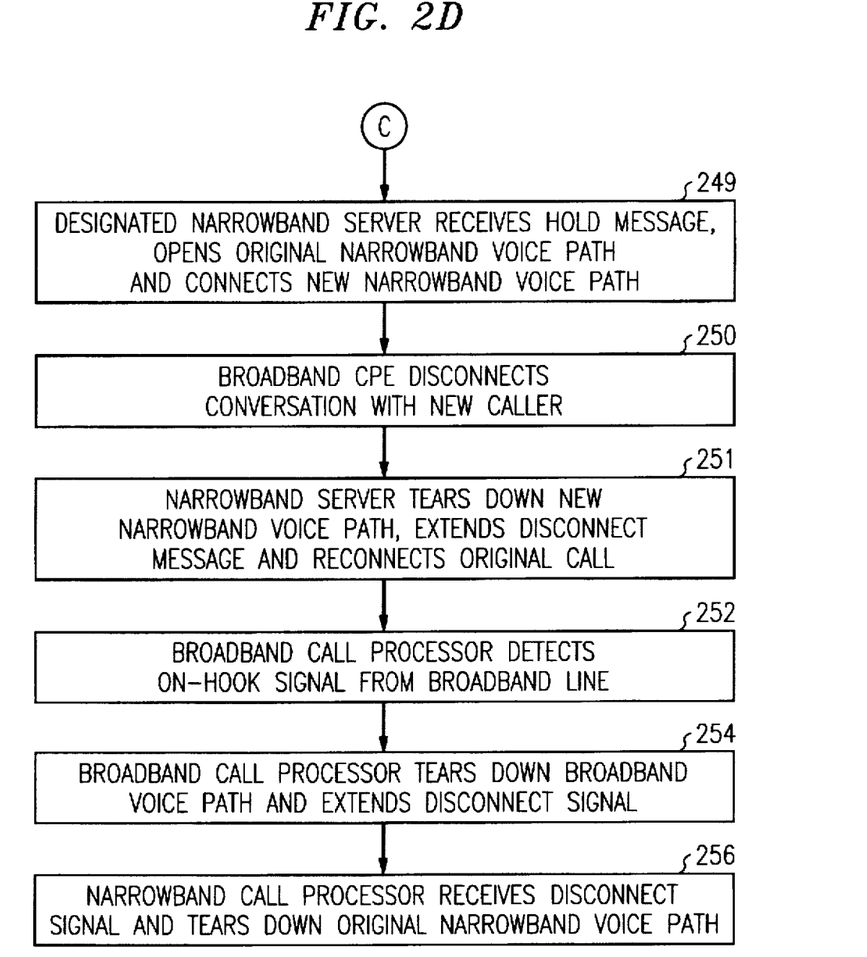

The process continues through connector C to FIG. 2D and step 249 in which designated narrowband server 119 receives the hold message from broadband call processor 104, opens first narrowband voice path 172-1, and interconnects the incoming call initiated by the caller at telephone 151 via second narrowband voice path 172-2. Narrowband voice path 172-2 is established in the same manner as voice path 172-1, and is also interconnected to broadband segment 190. If the party at broadband CPE subsequently elects to activate three-way calling to include the party at telephone 117 in the newly established conversation with the party at telephone 151, narrowband server 119 reconnects first voice path 172-1 to broadband segment 190 (via SAC 116) upon receipt of a reconnect signal from broadband call processor 104. In this case, however, assume that the party at broadband CPE 111 does not initiate a three-way call. Instead, after a period of conversation, the broadband CPE 111 disconnects the call with the new caller at telephone 151 in step 250. In step 251, narrowband server 119 tears down second narrowband voice path 172-2, and extends a disconnect message to switch 154 over link 179, as is known in the art. Narrowband server 119 then reconnects the narrowband voice path 172-1 to broadband segment 190.

Eventually, the original conversation between the party at broadband CPE 111, and the party at telephone 117 ends. In step 252, broadband call processor 104 detects an "on-hook" signal indicating that the caller has returned broadband CPE 111 to an "inactive" state. In step 254, broadband call processor 104 tears down broadband segment 190, and extends a disconnect signal in narrowband signaling format to designated narrowband server 119 via message switch 120. The disconnect signal indicates to the narrowband server that first narrowband voice path 172-1 may be relinquished. In step 256, narrowband call processor 173 tears down voice path 172-1.

Figure 3A:
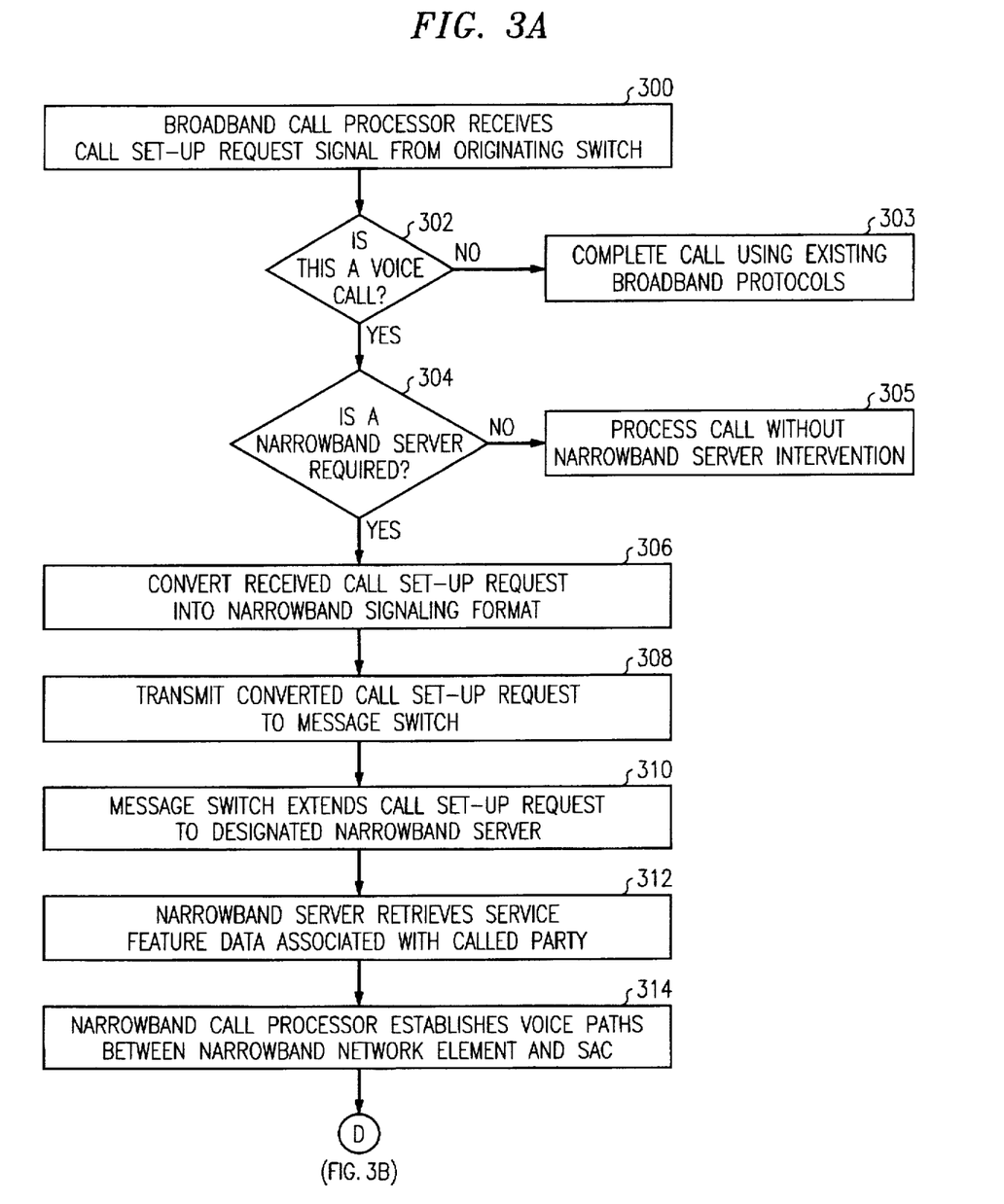
FIGS. 3A and 3B are flow diagrams of the steps performed by the integrated switch of FIG. 1 when a subscribing broadband line receives a call in which narrowband-related service features are activated.
Figure 3B:
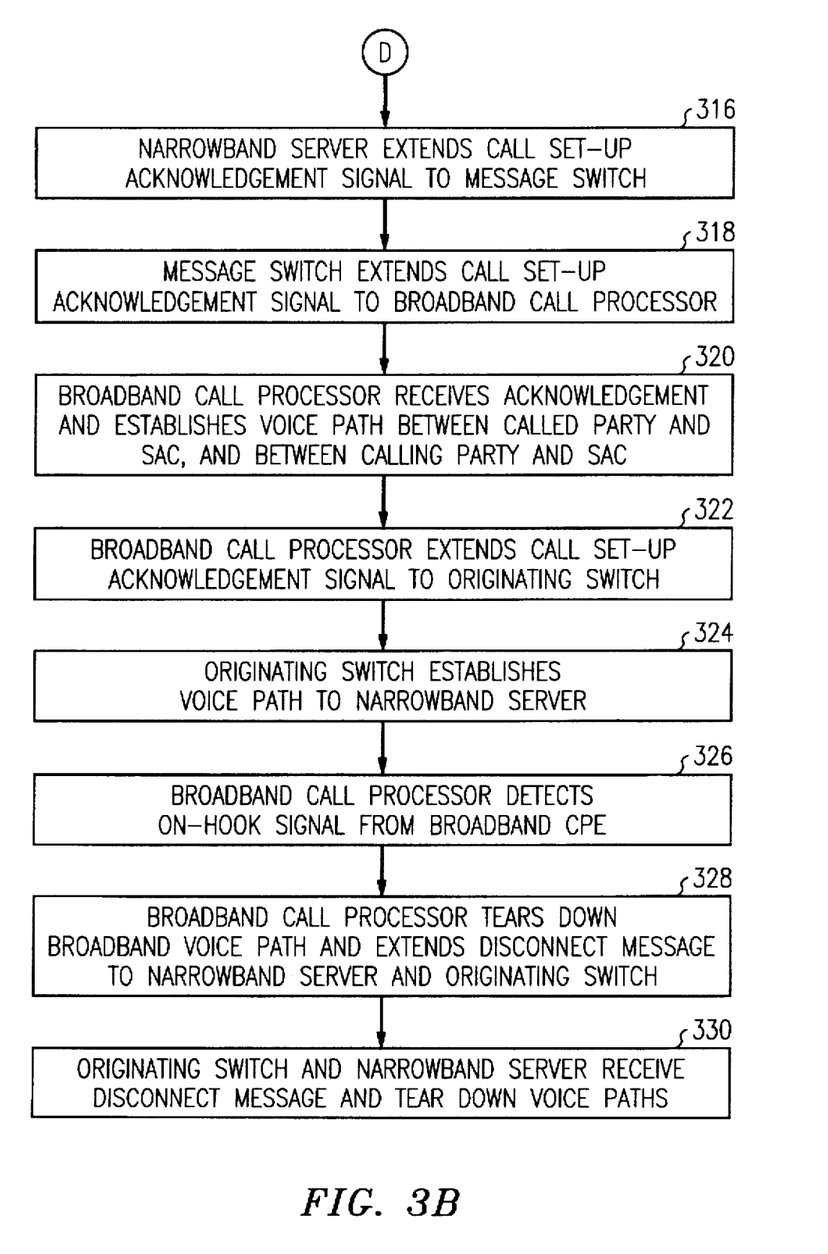

The call flow described above illustrates the steps performed by integrated switch 100 when a broadband subscriber of narrowband-related service features originates a call. FIG. 3 shows the steps performed by integrated switch 100 when the broadband subscriber receives a call. Particularly, assume that a caller associated with broadband CPE 141 wishes to place a call to the party associated with broadband CPE 111. The call receiving process begins in step 300 in which broadband call processor 104 receives a call set-up request signal originating from broadband switch 144 (that is, the switch serving broadband CPE 141) from broadband sub-network 124, via channel link 107, as known in the art. The call set-up request signal includes directory number "(708) 555-0000" corresponding to the called party (that is, the party associated with broadband CPE 111), directory number "(812) 555-2388" identifying broadband CPE 141 associated with the caller, and the call-type. On the other hand, incoming calls originating from narrowband callers served by switches other than integrated switch 100 are received in narrowband server 119, as described above. Whether the call is originated by a broadband caller or a narrowband caller, however, the call set-up request signal is ultimately received in broadband call processor 104.

The process continues to decision step 302 in which broadband call processor 104 determines whether the received call set-up signal specifies a voice-type call. If the outcome of decision step 302 is a "NO" determination, the process continues to step 303 in which the non-voice call is processed using broadband protocols, as known in the art. In this case, the outcome of decision step 302 is a "YES" determination, so the process continues to decision step 304 in which broadband call processor 104 determines whether the requested called party subscribes to narrowband-related service features by accessing subscriber information in database 103. Database 103 also contains information indicating the designated narrowband server of the called party. In other words, decision step 304 requires the broadband call processor to determine if a narrowband server is required, and if so, the identification of the designated narrowband server. If the outcome of decision step 304 is a "NO" determination, the process continues to step 305 in which the call connection is processed without narrowband server intervention. In this case, the outcome of decision step 304 is a "YES" determination, so the process continues to step 306 in which broadband call processor 104 converts the received call set-up signal to narrowband signaling format.

In step 308, broadband call processor 104 transmits the converted call set-up signal, an indication that the caller is also a broadband subscriber, and designated narrowband server information derived from database 103 to MS 120 for delivery to the narrowband server 119. In step 310, MS 120 extends the call set-up signal to narrowband server 119. In step 312, designated narrowband server 119 retrieves service feature data associated with the broadband line corresponding to directory "(708) 555-0000" from database 175. In step 314, narrowband call processor 173 establishes narrowband voice paths 172-3 and 172-4 between network element 177 and SAC 116. Two separate narrowband voice paths (that is, voice paths 172-3 and 172-4) must be established to interconnect narrowband server 119 with the subscribing broadband line and the broadband caller, as described below.

The process continues through connector C to FIG. 3B and step 316 in which designated narrowband server 119 extends a call set-up acknowledgment signal to MS 120 for delivery to broadband call processor 104. The call set-up acknowledgment signal includes information identifying narrowband voice paths 172-3 and 172-4 established in the previous step. In step 318, MS 120 extends the call set-up acknowledgment signal to broadband call processor 104 over provisioned signaling path 128. The process continues to step 320 in which broadband call processor 104 receives the call set-up acknowledgment signal, and establishes broadband segment 191 interconnecting broadband line 131 and SAC 116. Broadband segment 191 is established to form composite voice path 191/172-3 such that broadband line 131 is interconnected to the network element 177 via SAC 116. Simultaneously, broadband call processor 104 establishes broadband segment 193 between channel link 107 and SAC 116 to form composite voice path 193/172-4. Composite voice path 193/172-4 interconnects the broadband caller at broadband CPE 141 to narrowband server 119. In step 322, broadband call processor 104 extends a call set-up acknowledgment signal to originating switch 144, as known in the art. As a result of step 324, the caller associated with broadband CPE 141 is interconnected to the called party associated with broadband CPE 111 via narrowband server 119. When narrowband-related service features must be activated during the course of the call between the party at broadband CPE 141 and the party at broadband CPE 111, designated narrowband server 119 initiates appropriate action, as described above. Eventually the conversation between the caller at broadband CPE 141 and the called party at broadband CPE 111 ends. In step 326, broadband call processor 104 detects an on-hook signal from broadband CPE 111. The process continues to step 328 in which the broadband call processor tears down broadband segments 191, 193 and extends a disconnect message to narrowband server 119 and originating switch 144. In step 330, narrowband server receives the disconnect message, and tears down voice paths 172-3 and 172-4.

Advantageously, the present invention provides state-of-the-art voice-related service features to broadband subscribers without development of broadband-specific software applications. By utilizing existing narrowband voice-related service feature applications, and performing all processing of those service features in a narrowband server, traditional, narrowband-related service features can be delivered to broadband subscribers in a cost efficient manner. While the invention has been particularly illustrated and described with reference to the preferred embodiment, alternative embodiments may be devised by those skilled in the art without departing from the scope of the invention.

What is claimed is:

1. In an integrated telecommunication switching system comprising a broadband switching fabric which serves at least one broadband subscriber and a narrowband server associated with the broadband switching fabric, a method for providing service features to the broadband subscriber comprises the steps of:

receiving call set-up signals in a broadband call processor;

the broadband call processor converting the call set-up signals to narrowband signaling format;

the broadband call processor delivering the converted call set-up signal to a designated narrowband server;

the designated narrowband server establishing a narrowband voice path to a synchronous-to-asynchronous converter (SAC) in response to receiving the call set-up signals;

the broadband call processor establishing a broadband segment corresponding to the narrowband voice path established by the designated narrowband server to form a composite voice path interconnecting a subscribing broadband line to the designated narrowband server; and the designated narrowband server providing service features to the subscribing broadband line over the composite voice path.

2. The method of claim 1 wherein the step of the broadband call extending the converted call set-up signal to the designated narrowband server comprises the step of:

transmitting the converted call set-up signal to the designated narrowband server via a message switch.

3. The method of claim 1, and further comprising the step of:

the designated narrowband server releasing the narrowband voice path to the SAC upon receipt of a disconnect signal from the broadband call processor.

4. The method of claim 1 further comprising the step of:

the broadband call processor receiving the call set-up signal from a party other than a caller associated with the subscribing broadband line.

5. The method of claim 1 further comprising the step of:

the designated narrowband server receiving a call set-up request signal directed to the subscribing broadband line; and the designated narrowband server extending the received call set-up request signal to the broadband call processor.

6. In a broadband switch serving at least one broadband subscriber line, a method for providing service features to the broadband subscriber line comprises the step of:

receiving a call set-up signal;

determining whether the received call set-up signal originates from a broadband subscriber line which subscribes to narrowband-related service features;

responsive to a determination that the broadband subscriber line subscribes to narrowband-related service features, converting the call set-up signal to narrowband signaling format;

extending the converted call set-up signal to the narrowband server;

receiving an acknowledgment signal from the narrowband server; and establishing a broadband segment to interconnect the broadband subscriber line to a synchronous-to-asynchronous converter (SAC) in response to receiving the acknowledgment signal.

7. The method of claim 6 wherein the step of determining whether the broadband subscriber line subscribes to narrowband-related service features comprises the step of;

accessing a broadband subscriber line database.

8. The method of claim 6 wherein the step of converting the call set-up signal to narrowband signaling format comprises the step of:

accessing a broadband-to-narrowband conversion program.

9. The method of claim 6 wherein receiving a call set-up signal comprises the step of:

receiving a call set-up signal from a party not associated with the broadband subscriber line.

10. The method of claim 6 further comprising the step of:

converting the received acknowledgment signal from a narrowband signaling format to a broadband signaling format.

11. An integrated telecommunications switch serving at least one broadband subscriber comprises:

a broadband call processor including a narrowband-related service feature database and a broadband-to-narrowband conversion program; and at least one narrowband server for providing narrowband-related service features to the broadband subscriber over a voice path including broadband and narrowband portions.

12. The integrated telecommunications switch of claim 11 further comprising:

a synchronous-to-asynchronous converter (SAC) interconnecting a broadband switching fabric to the narrowband server.

13. The integrated telecommunications switch of claim 12 wherein the narrowband server maintains a multi-channel link to the SAC for establishing a narrowband voice path on a per call basis.

14. The integrated telecommunications switch of claim 11 further comprising a message switch for relaying signaling messages between the broadband call processor and the narrowband server.

* * * * *